US006152017A

United States Patent [19]

Harrer et al.

[11] Patent Number: 6,152,017

[45] Date of Patent: Nov. 28, 2000

[54] LIGHTWEIGHT PISTON

[75] Inventors: Josef Harrer, Hiltpoltstein; Dirk Ragus, Nürnberg; Stephan Thieme, Hersbruck, all of Germany

[73] Assignee: Alcan Deutschland GmbH, Gottingen, Germany

[21] Appl. No.: 08/955,992

[22] Filed: Oct. 22, 1997

[30] Foreign Application Priority Data

Oct. 23, 1996 [DE] Germany ........................... 196 43 778

[51] Int. Cl.[7] ........................................................ F16J 1/04

[52] U.S. Cl. ................................. 92/237; 92/208; 92/238

[58] Field of Search ............................. 92/208, 232, 233, 92/237, 238; 123/193.6

[56] References Cited

U.S. PATENT DOCUMENTS

| | | | |
|---|---|---|---|
| 2,100,719 | 11/1937 | Nelson . | |
| 2,802,707 | 8/1957 | Day | 92/237 |
| 4,817,505 | 4/1989 | Rhodes | 92/237 |
| 4,856,417 | 8/1989 | Ishikawa . | |
| 5,058,489 | 10/1991 | Iwaya . | |
| 5,076,225 | 12/1991 | Tokoro et al. . | |
| 5,158,008 | 10/1992 | Ripberger et al. . | |
| 5,172,626 | 12/1992 | Hart | 123/193.6 |
| 5,331,932 | 7/1994 | Watanabe et al. . | |
| 5,448,942 | 9/1995 | Arai et al. . | |
| 5,487,364 | 1/1996 | Takeda et al. . | |
| 5,560,283 | 10/1996 | Hannig | 92/208 |

FOREIGN PATENT DOCUMENTS

| | | |
|---|---|---|
| 422513 | 5/1954 | Belgium . |
| 171566 | 2/1986 | European Pat. Off. . |
| 385390 | 9/1990 | European Pat. Off. . |
| 429821 | 6/1926 | Germany . |
| 3843761 | 7/1990 | Germany . |
| 4122921 | 1/1992 | Germany . |
| 2238596 | 6/1991 | United Kingdom . |

OTHER PUBLICATIONS

Office Action in corresponding German patent application number 1 96 43 778.4.

Translation of excerpt of this Office Action in corresponding German patent application number 1 96 43 778.4.

*Primary Examiner*—Thomas E. Denion

*Attorney, Agent, or Firm*—Stevens, Davis, Miller & Mosher, LLP

[57] ABSTRACT

A piston (10) comprises a piston shaft (16) and an essentially cylindrical upper region (14). The piston shaft (16) essentially comprises two opposite shaft wall portions (16) relative to the pin axis. Two pin hubs (24) are also set back relative to the piston axis in the direction of the diameter of the piston shaft (16). On the piston are formed two communicating walls (18) which connect the shaft wall portions (16), which are also set back, which extend as far as the lower edge of the essentially cylindrical region (14) and in which the pin hubs (24) are located. According to the invention, the shaft wall portions (16) are provided in a largely concurrent manner with a dimension in the circumferential direction, this dimension varying in the direction of the piston axis. The communicating walls (18) also follow the thereby determined course of the edges of the two shaft wall portions (16), with these edges extending in the direction of the piston axis.

22 Claims, 2 Drawing Sheets

LIGHTWEIGHT PISTON

FIELD OF THE INVENTION

The invention relates to a piston for an internal combustion engine.

BACKGROUND OF THE INVENTION

Such a piston is described in EP 0 385 390 A1 and usually comprises shaft surfaces which in some of the regions along the height of the piston shaft, are completely cylindrical and have a circular cross-section. The piston shaft is largely cylindrical in an upper region in order to close the chamber for the combustion that takes place inside an internal combustion engine. To reduce the piston weight, the pin hubs for receiving the conrod pin are inwardly set back in the direction of the piston shaft diameter. As a result, those regions of the pin hubs which are indispensable for receiving the gudgeon pin are offset from the shaft surface, i.e. inwardly from the piston's outer surface, relative to the piston axis. In consequence, material can be saved in the outer regions, thereby reducing the weight.

At the height of the pin hubs and below them, however, such a piston with inwardly offset pin hubs also has to comprise shaft wall portions, with which the piston makes contact with the cylinder wall once it has been installed into the cylinder of an internal combustion engine. These shaft wall portions, also designated as load-bearing shaft wall portions because they ensure that the piston is guided within the cylinder, are therefore formed in a lower region of the piston shaft at radially opposite sides relative to the pin axis, viz. at the thrust side on the one hand and at the counterthrust side on the other. These shaft wall portions ensure that the piston is supported at this sites during the reciprocating movement inside the cylinder; during this movement, the piston can tilt around the gudgeon pin axis. During this tilting movement at the top and bottom dead centers, there particularly occurs an alternation with respect to that side with which the piston makes contact with the cylinder wall, from the thrust side to the counterthrust side or vice versa. This tilting movement is restricted, as far as necessary, by the load-bearing shaft wall portions. In its lower region, the piston shaft of the pistons according to the class comprises communicating walls which are inwardly set back and in which the pin hubs are located. These communicating walls extend as far as the lower edge of the piston shaft. A wrap-around ring adapted so as to connect the two opposite shaft wall portions together is therefore missing at the piston's lower edge.

By economizing on material in the areas outside the set-back pin hubs, such a piston ensures that it is possible to reduce the piston weight considerably.

SUMMARY OF THE INVENTION

It is the present invention's object to reduce the weight of such a piston further, while simultaneously complying with the requirements expected of pistons in terms of strength and a low noise level.

This object is solved by a piston of the present invention.

The two shaft wall portions are therefore designed with a dimension in the circumferential direction, i.e. to a certain extent a width which varies in the direction of the piston axis, i.e. across the piston height. The communicating walls are also formed so as to follow the course of the shaft wall portion edges extending in the direction of the piston axis. According to the invention, the width of the two shaft wall portions is designed to increase toward the lower end of the piston shaft. The two communicating walls are therefore at an angle and are tilted toward one another such that their gap is greater in a lower region than in an upper region. In other words, the communicating walls to a certain degree extend conically to one another. The shaft wall portions' width dimension, which varies according to the invention across the piston height, makes it possible for further material to be saved particularly in those zones in which the shaft wall portions can be designed more narrowly. The possible weight reduction amounts to as much as 15% for the piston according to the invention.

According to the invention, the shaft wall portions are as a whole adapted such as to be load-bearing shaft wall portions, and no zones which do not contribute toward supporting the piston at the inner cylinder wall are formed on the shaft walls. In consequence, such regions are unnecessary with regard to strength and are recessed according to the invention. These regions particularly relate to ones which are set back by more than 0.2 mm with respect to the cylinder wall. The course of the shaft wall portions can also be adapted to those requirements to be satisfied by the piston's elasticity.

At the same time, it is possible to ensure a reliable operating characteristic for the piston in that the load-bearing shaft wall portions are present where necessary. In particular, this can for example be achieved without shortening the piston shaft, which represents one possible way to reduce the weight, although it entails the risk of considerably increasing piston noise caused by tilting in a cold state. As a result of regionally setting back the shaft wall portions according to the invention, it is possible to avoid a reduction in wall thickness or to set the pin hubs back further, which does admittedly bring about a weight saving, but considerably reduces the piston's strength. The invention is therefore used to improve the piston according to EP 0 385 390 A1 to the extent that the shaft wall portions, which are designed in this piston to have a constant width across the entire height, are regionally tapered such as to achieve an appreciable weight reduction without losses in terms of strength and support characteristics inside the cylinder. As mentioned, the communicating walls are adapted to the course of the shaft wall portions' lateral edges.

As mentioned, the two load-bearing shaft wall portions are designed to taper upwards with regard to their dimension in the circumferential direction. In other words, when viewed from the side, the shaft wall portions are largely shaped as an inverted T and are designed to be much wider in a lower region than in an upper region in which they adjoin that piston shaft region which is enclosed in the circumferential direction. In this preferred embodiment, the two communicating walls are also upwardly tilted relative to one another. The gap between the two communicating walls is therefore greater in a lower region than in an upper region, and adapting the alignment of the two communicating walls to the lateral edges of the shaft wall portions guarantees the shaft wall strength required to bear loads.

It is conceivable according to the invention for the two load-bearing shaft wall portions to be provided with desirably curved edges and for the communicating walls to be provided with a correspondingly desirably curved surface. As mentioned, the invention envisages economizing on as much material and hence weight as possible, so that it is in principle conceivable—naturally with largely flowing transitions—to recess the load-bearing shaft wall portions in all those regions which are not needed for support at the inner cylinder wall. It is therefore advantageous for shaft wall portions in this embodiment to be designed with desirably curved edges.

Although it is known from U.S. Pat. No. 5,076,225 to provide the shaft wall portions with a width that varies across the height of the piston shaft in the case of a piston which comprises a circular cross-section both in the upper and lower regions in the circumferential direction and which therefore also exhibits increased stability in its lower region, such a piston cannot be compared with the piston according to the class, because the stability of this particular piston is also constantly ensured in a lower region by means of the wrap-around ring formed at its lower end. The shaft wall portions can consequently be directly designed to have a variable width without jeopardizing piston stability. This measure is much more questionable, however, for the piston according to the class in terms of its strength and from the point of view of ensuring support within the inner cylinder wall, and this measure can only be compensated according to the invention in that the communicating walls are designed to follow the course of the shaft wall portion edges which extend in the direction of the piston axis.

A similar piston is known from DE 41 22 921 A1. The shaft wall portions are largely X-shaped, with the lower region again being formed by a wrap-around ring at the lower edge of the piston. The shaft is therefore recessed in places and the communicating walls are also relieved in the region of the recesses. Yet this impairs the strength of the shaft wall portions to the extent that the shaft surface does not always completely make contact with the cylinder wall. On the contrary, this is only achieved by designing the communicating walls in accordance with the invention in that these walls are not recessed at any point, but follow the course of the lateral edges of the load-bearing shaft wall portions in order to support these portions.

A piston which is intended to reduce piston clatter is also described in U.S. Pat. No. 4,856,417. The shaft wall portions are designed to taper downwards as a whole, and no indication can likewise be inferred from this document to the effect that the shaft wall portions can be reduced to the load-bearing shaft wall portions and can consequently be designed to taper upwards, which leads to considerable weight savings according to the invention.

U.S. Pat. No. 5,448,942 also describes a piston, whose load-bearing regions of the shaft walls have the shape of an inverted T. But the other, non-load-bearing regions of the shaft walls are also present on this piston, rendering such a piston disadvantageous in terms of its weight. This equally applies to the piston according to U.S. Pat. No. 5,058,489 in which the shaft walls are also formed by the actual contact region with the cylinder wall and by other regions, making the resultant piston unnecessarily heavy.

Although any material suitable for a piston is basically conceivable for the piston according to the invention, preference is given to designing the piston from light metal, such as aluminum or an aluminum alloy, in order to use the choice of metal to keep the piston's weight to a minimum.

The shaft wall portions are therefore preferably shaped such as to ensure that the piston is supported at an inner cylinder wall in the region of their overall outer surface as load-bearing shaft wall portions. As described, that width dimension which is absolutely necessary for piston guidance can consequently be selected for the shaft wall portions for each site along the height of the piston shaft. It is possible to dispense with any other regions of the shaft wall portions which are designed such that when installed into a cylinder, they are set back by more than 0.2 mm with respect to the cylinder wall. Once installed into the cylinder with the aforementioned gap in relation to the inner cylinder wall, these zones of the shaft wall portions do not in fact contribute toward bearing the piston load or supporting the piston at the cylinder wall.

According to the embodiments described above, the edges—which extend in the direction of the piston axis—of the load-bearing shaft wall portions are preferably linear throughout the course of their taper. If it can be ascertained in tests that the load-bearing region of the shaft surfaces can be limited by largely straight lines, this embodiment of the load-bearing shaft wall portions represents a comparatively simple design which contributes toward simplifying the casting molds used.

Yet it may be just as advantageous for the lateral edges of the load-bearing shaft wall portions to be curved throughout the course of their taper, so that the communicating walls are concavely or convexly curved relative to their course in the direction of the piston axis. The two communicating walls would therefore be convexly curved if the lateral edges of the shaft wall portions were curved outwards when viewed from the side. In special applications it has also proved to be beneficial for the lateral edges of the load-bearing shaft wall portions to be inwardly curved, so that the two communicating walls accordingly not only have to be designed to tilt upwards or downwards relative to one another, but also each have to be concavely curved.

As regards the piston according to the invention, it is also preferable for the piston shaft to be hollowed out at its lower side in its upper region projecting over the set-back pin hubs. This measure is made possible in that the pin hubs of the piston according to the invention are set back as far as possible from the shaft walls. A certain projection of the upper cylindrical piston region is therefore produced in this area. These regions in the zone of the gudgeon pin axis are not essential to supporting the piston, because the piston is only essentially able to tilt around the gudgeon pin axis, so that hollowing out the projection over the gudgeon pin axis makes it possible economize further on material and weight without jeopardizing the piston's strength and support.

According to another preferred embodiment, it is envisaged that the pin hubs are stepped on their facing sides for use with a stepped conrod. This measure is particularly suitable for the piston according to the invention when the load-bearing shaft wall portions are tapered upwards. As a result, the two communicating walls are upwardly tilted towards one another so that those zones in which the pin hubs are to be formed are also very considerably inwardly offset, particularly in an upper region. Yet to ensure the necessary support surface for the gudgeon pin, the pin hubs are, as described, stepped in this preferred embodiment so that the gap between the pin hubs is smaller in an upper region than in a lower region. This ensures the necessary support surface for the gudgeon pin, despite the extensive inwards shift of the pin hubs. When using a stepped conrod or a trapezoidal conrod, which is consequently designed to be narrower in an upper region than in a lower region of its pin hub, a particularly advantageous weight saving can be achieved by the piston according to the invention in this embodiment, while ensuring strength and function.

The invention will be described in detail as follows by means of the embodiments represented in the drawings.

DETAILED DESCRIPTION OF THE PREFERRED EMBODIMENTS

Figure 1:
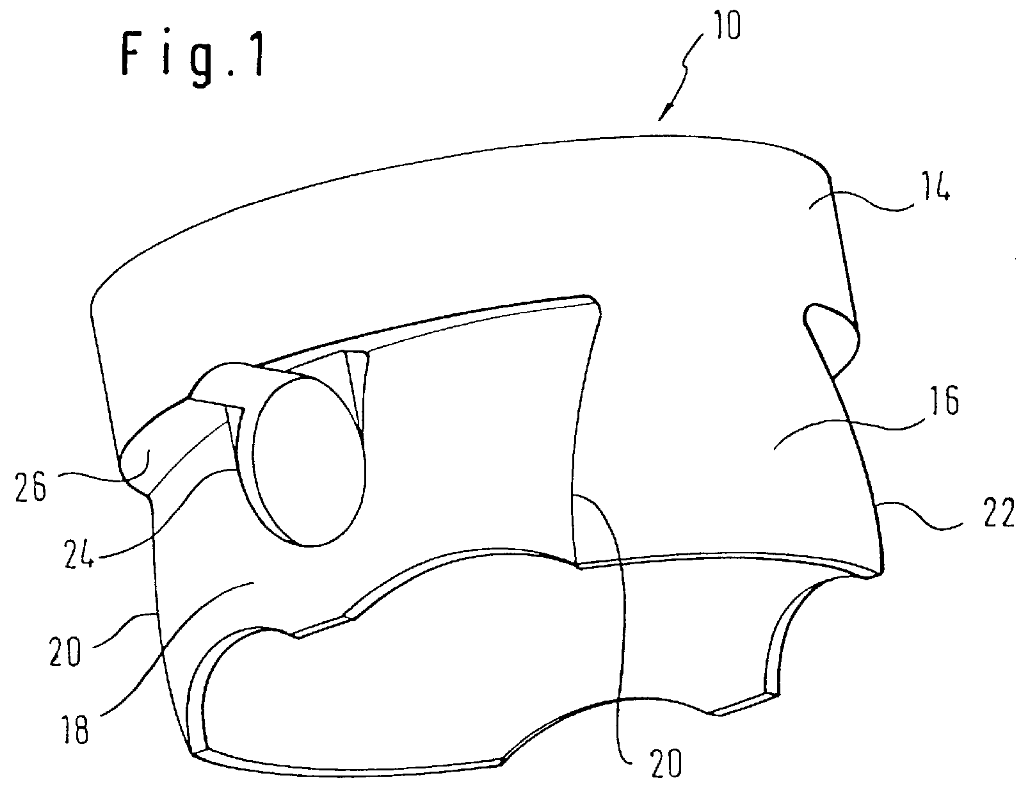
FIG. 1 shows a schematic perspective view of the piston according to the invention in a first embodiment.

The piston 10 depicted in FIG. 1 comprises a piston shaft 16 and an upper, largely cylindrical region 14. In this upper region 14, i.e. the ring area, the piston 10 can be provided with one or more partially peripheral slots parallel to the piston top. The pin hubs 24, which are used to receive the gudgeon pin (not shown) when assembling the piston with a conrod (not shown), are formed beneath the cylindrical region 14.

As can be easily identified in FIG. 1, the two pin hubs 24 of the piston according to the class are each set back in the direction of the diameter of the piston shaft 16, so that an overhang 26 is produced at the lower end of the upper region 14 of the piston 10. Setting back the pin hubs 24 in this way makes it possible to save on material in the region below the overhang 26 on the piston according to the class, thus enabling a reduction in the weight of the piston 10.

Two opposite shaft wall portions 16, which form the piston shaft, are also formed in a lower region of the piston. Only the front shaft wall portion 16 according to the selected orientation of the piston 10 can be identified in the drawing. The two shaft wall portions 16 are connected together by two communicating walls 18 which are each formed between the lateral edges 20, 22 of the shaft wall portions 16. Of the two communicating walls 18, only that communicating wall 18 which connects the left-hand edge 20 (according to FIG. 1) of the front shaft wall portion 16 to the corresponding edge 20 of the rear shaft wall portion can in turn be identified in the depiction chosen for FIG. 1. As can be identified in FIG. 1, the two communicating walls 18 reach as far as the lower edge of the piston shaft and are inwardly set back. The pin ends 24 are also located in the two communicating walls 18.

According to the invention, the two shaft wall portions 16 are designed with a dimension in the circumferential direction, i.e. to a certain extent a width which varies in the direction of the piston axis. According to the invention, this measure makes it possible to save on further material and hence weight in those regions of the shaft wall portions 16 which are not needed to support the piston on an inner cylinder wall. According to the invention, the two communicating walls 18 are further designed so as to follow the course of the edges 20, 22—which extend in the direction of the piston axis—of the shaft wall portions 16. According to the embodiment depicted in FIG. 1 and in which the two shaft wall portions 16 are designed to taper upwards, an arrangement of the communicating walls 18 is obtained in which these walls are upwardly inclined toward one another. In other words, the communicating walls 18 are to a certain extent positioned at an angle.

In the embodiment shown in FIG. 1, the lateral edges 20, 22 of the load-bearing shaft wall portions 16 are also convexly curved. The communicating walls 18 are therefore also convexly curved in the region of their surface, i.e. throughout the course from the piston's lower edge down to the overhang 26.

Figure 2:
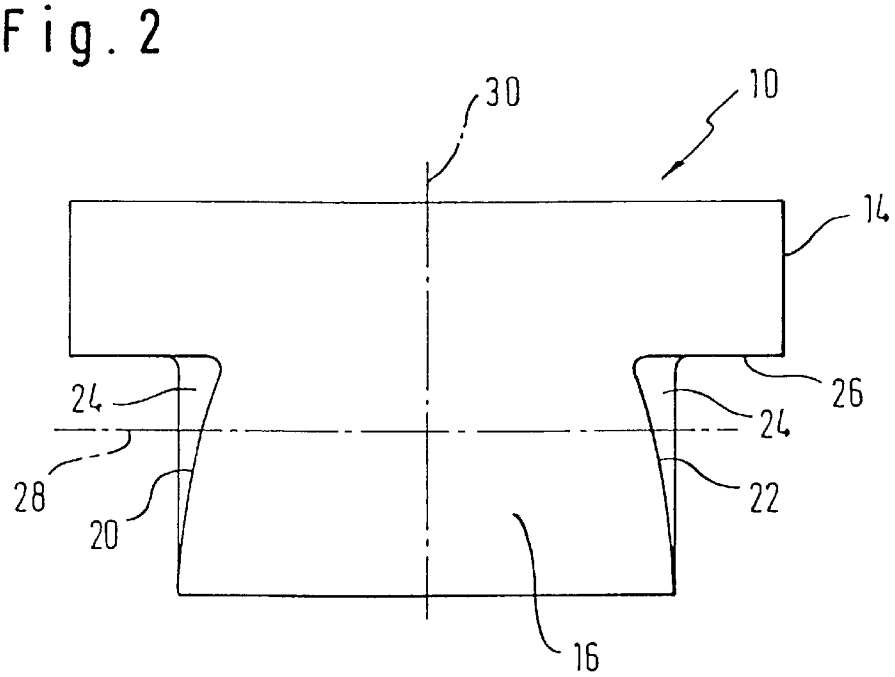
FIG. 2 a side view of the piston depicted in FIG. 1.

The curved course of the lateral edges 20, 22 of the front shaft wall portion 16 can again be easily identified in the side view of FIG. 2 in a direction normal to the gudgeon pin axis 28. It is also made apparent from the side view of FIG. 2 as to how the pin hubs 24 of the piston 10 according to the invention are set back with respect to the circumferential edge of the upper portion 14, thus producing an overhang 26. As mentioned, setting back the pin hubs 24 in this way makes it possible to save on material at the zones located to the left and right in the region of the pin axis 28.

According to the invention, the weight saving achieved as a result is further increased in that the shaft wall portions 16 formed on radially opposite sides relative to the pin axis 28 do not exhibit, across their entire height, a width which corresponds to the widest site needed to support the piston 10. On the contrary, the shaft wall portion 16 is respectively designed along its height to be only as wide as is necessary for supporting the piston 10 on an inner cylinder wall. For instance, another distinct weight reduction can be achieved according to the upwardly tapering design of the load-bearing shaft wall portions 16 depicted in FIG. 2. Based on the view of FIG. 2, it is again illustrated that no cross-sectionally circular region which dimensionally corresponds to the upper region 14 is formed at the piston 10 according to the invention at its lower edge. The two communicating walls 18 are also set back on the piston 10 along its circumference.

Figure 3:
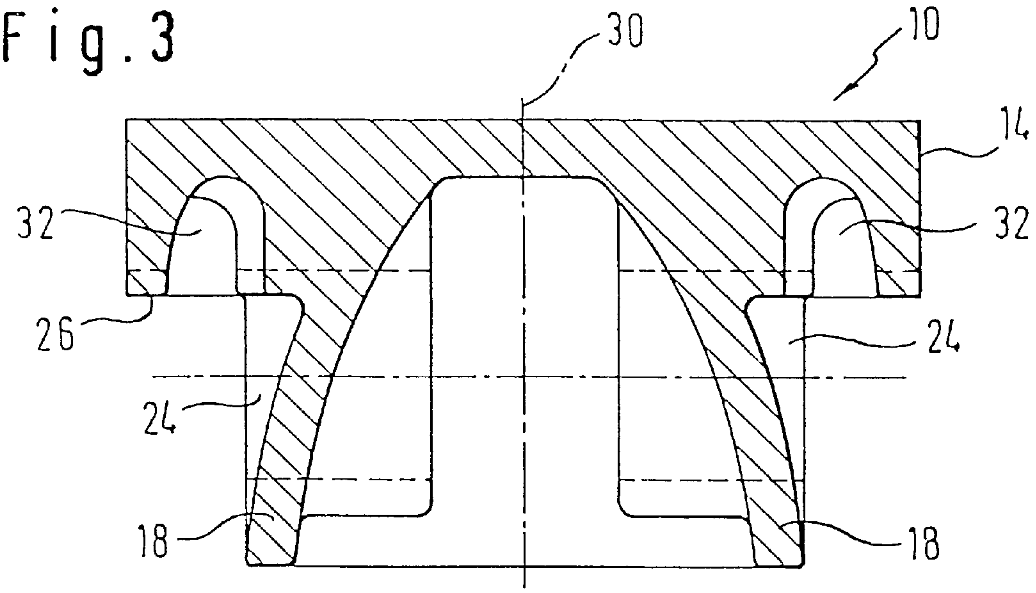
FIG. 3 a sectional view of the piston according to the invention in a second embodiment.

FIG. 3 shows an advantageous extension of the piston 10 depicted in FIGS. 1 and 2. On the one hand, the angled course of the two communicating walls 18 according to the invention can again be identified in the sectional depiction of FIG. 3 in the region of the piston axis 30. It can be identified from the convexly curved pattern of the communicating walls 18 that the course of the (non-depicted) edges 20, 22 of the shaft wall portions 16 roughly correspond to the course shown in FIGS. 1 and 2. It can also be identified in the sectional representation that the two pin hubs 24 are each set back from the outer edge of the upper region 14, though they have the same width across their entire height along the piston axis 30.

The piston 10 depicted in FIG. 3 is also provided with hollows 32 in the area of the overhang 26 of the upper region 14 over the pin hubs 24. These hollows can be formed because the upper region 14, as described, has an overhang 26 in this area. The inclined position of the communicating walls 18, which increases the width of the overhang 26, also enables the formation of the cavities 32. These cavities can be formed either by milling out the cast piston or by suitable cast cores during the very process of casting. A further reduction in piston weight can be achieved by this measure as a result of saving on material in the region of the cavities 32 for the piston 10 according to the invention.

Figure 4:
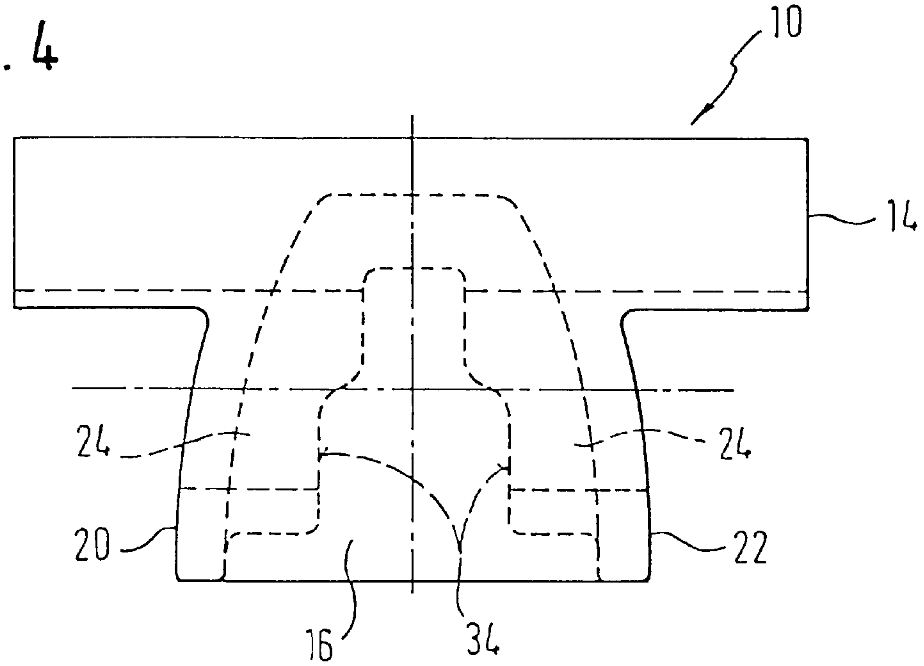
FIG. 4 a side view of the piston according to the invention in a third preferred embodiment.

FIG. 4 depicts another embodiment of the piston 10 according to the invention. In this embodiment, the piston 10 is suitable for use with a stepped conrod (not shown). In the case of a stepped conrod, the lug, within which the gudgeon pin is received, is narrower in an upper region than in a lower region. The pin hubs 24 of the embodiment of the piston 10 according to the invention, as depicted in FIG. 4, are correspondingly formed. This means that the inner edges 34 of the pin hubs 24 are designed such as to have a smaller gap in an upper region than in a lower region. In the event that the pin hubs are set back very far, for example in the embodiment depicted in FIG. 4, right up to the lateral edges 20, 22 of the shaft wall portion 16, a sufficiently large bearing surface for the gudgeon pin can also be ensured by this measure. This is achieved by widening the pin hubs 24 in their upper regions. The same also applies to so-called trapezoidal conrods.

It should be noted that the communicating walls 18 do not have to be designed to be so straight between the shaft wall portions 16 to be connected that only their outlines are discernible in the side and cross-sectional views of FIGS. 2 to 4. On the contrary, the communicating walls 18 in the region of the pin hubs 24 can be designed to be outwardly spherical, so that an outwardly curved "cross-section" of the communicating walls 18 would be identifiable when viewed from below. But it is essential to the invention for the communicating walls 18 to follow the width—which varies across the height of the piston 10—of the shaft wall portions 16 in terms of their outline that can be identified in the side and cross-sectional views. Despite recessing the shaft wall portions 18 in those zones which are not necessary for support, a sufficient strength of the piston 10 according to the invention can be ensured as a result.

We claim:

1. A piston (10) comprising:

a piston shaft (16) having a piston axis (30), an upper essentially cylindrical region (14), pin hubs (24) for receiving a pin and defining a pin axis (28), the pin hubs (24) being set back in the direction of the pin axis (28) relative to the piston axis (30), two shaft wall portions (16) formed at radially opposite sides relative to the pin axis (18) in a lower region of said essentially cylindrical region (14), and two set-back communicating walls (18) connecting said shaft wall portions (16) and in which said pin hubs (24) are located, and extending as far as the lower edge of said piston shaft, wherein said two shaft wall portions (16) are designed as load-bearing shaft wall portions, and the piston has regions for not contributing toward supporting said piston (10) on an inner cylinder wall, said regions being recessed, said two shaft wall portions (16) have lateral edges (20, 22), said two shaft wall portions being upwardly tapering in a largely concurrent manner in terms of their dimension in the circumferential direction, and said communicating walls (18) follow the course of said edges (20, 22) of said shaft wall portions (16), said edges extending in the direction of the piston axis (30), such that said communicating walls are upwardly inclined toward one another.

2. A piston according to claim 1, wherein said lateral edges (20, 22) of said load-bearing shaft wall portions (16) are largely linear throughout the course of the tapering of the shaft wall portions.

3. A piston according to claim 1, wherein said lateral edges (20, 22) of said load-bearing shaft wall portions (16) are curved throughout the course of the tapering of the shaft wall portions, and said communicating walls (18) are concavely curved relative to their course in the direction of the piston axis (30).

4. A piston according to claim 1, wherein said lateral edges (20, 22) of said load-bearing shaft wall portions (16) are curved throughout the course of the tapering of the shaft wall portions, and said communicating walls (18) are convexly curved relative to their course in the direction of the piston axis (30).

5. The piston according to claim 1, wherein said piston is made of a light metal.

6. The piston according to claim 1, wherein said piston is made of an aluminum alloy.

7. The piston according to claim 1, wherein said lateral edges (20, 22) of said two shaft wall portions (16) are curved.

8. A piston according to claim 1, wherein for use with a stepped conrod or trapezoidal conrod, said pin hubs (24) are formed to have facing sides (34) to define a gap between said pin hubs (24), the gap having a gap upper region and a gap lower region, wherein the gap is smaller in the gap upper region than in the gap lower region.

9. A piston according to claim 2, wherein for use with a stepped conrod or trapezoidal conrod, said pin hubs (24) are formed to have facing sides (34) to define a gap between said pin hubs (24), the gap having a gap upper region and a gap lower region, wherein the gap is smaller in the gap upper region than in the gap lower region.

10. A piston according to claim 3, wherein for use with a stepped conrod or trapezoidal conrod, said pin hubs (24) are formed to have facing sides (34) to define a gap between said pin hubs (24), the gap having a gap upper region and a gap lower region, wherein the gap is smaller in the gap upper region than in the gap lower region.

11. A piston according to claim 4, wherein for use with a stepped conrod or trapezoidal conrod, said pin hubs (24) are formed to have facing sides (34) to define a gap between said pin hubs (24), the gap having a gap upper region and a gap lower region, wherein the gap is smaller in the gap upper region than in the gap lower region.

12. A piston (10) comprising:

a piston shaft (16) having a piston axis (30), an upper essentially cylindrical region (14), pin hubs (24) for receiving a pin and defining a pin axis (28), the pin hubs (24) being set back in the direction of the pin axis (28) relative to the piston axis (30), two shaft wall portions (16) formed at radially opposite sides relative to the pin axis (28) in a lower region of said essentially cylindrical region (14), and two set-back communicating walls (18) connecting said shaft wall portions (16) and in which said pin hubs (24) are located, and extending as far as the lower edge of said piston shaft, wherein said two shaft wall portions (16) are formed as load-bearing shaft wall portions, and the piston has regions for not contributing toward supporting said piston (10) at an inner cylinder wall, said regions being recessed, said two shaft wall portions (16) comprise lateral edges (20, 22), said two shaft wall portions being upwardly tapering in a largely concurrent manner in terms of their dimension in the circumferential direction, said communicating walls (18) follow the course of said edges (20, 22) of said shaft wall portions (16), said edges extending in the direction of the piston axis (30), such that said walls are upwardly inclined toward one another, and said piston (10) having a portion (26) of said upper region (14) projecting over said set-back pin hubs (24), wherein said upper region portion (26) has a lower side which is hollowed out.

13. A piston according to claim 12, wherein said lateral edges (20, 22) of said load-bearing shaft wall portions (16) are largely linear throughout the course of the tapering of the shaft wall portion.

14. A piston according to claim 12, wherein said lateral edges (20, 22) of said load-bearing shaft wall portions (16) are curved throughout the tapering of the shaft wall portions, and said communicating walls (18) are concavely curved relative to their course in the direction of said piston axis (30).

15. A piston according to claim 12, wherein said lateral edges (20, 22) of said load-bearing shaft wall portions (16) are curved throughout the course of the tapering of the shaft wall portions, and said communicating walls (18) are convexly curved relative to their course in the direction of said piston axis (30).

16. A piston according to claim 12, wherein for use with a stepped conrod or trapezoidal conrod, said pin hubs (24) are formed to have facing sides (34) to define a gap between said pin hubs (24), the gap having a gap upper region and a gap lower region, wherein the gap is smaller in the gap upper region than in the gap lower region.

17. A piston according to claim 13, wherein for use with a stepped conrod or trapezoidal conrod, said pin hubs (24) are formed to have facing sides (34) to define a gap between said pin hubs (24), the gap having a gap upper region and a gap lower region, wherein the gap is smaller in the gap upper region than in the gap lower region.

18. A piston according to claim 14, wherein for use with a stepped conrod or trapezoidal conrod, said pin hubs (24)

are formed to have facing sides (34) to define a gap between said pin hubs (24), the gap having a gap upper region and a gap lower region, wherein the gap is smaller in the gap upper region than in the gap lower region.

19. A piston according to claim 15, wherein for use with a stepped conrod or trapezoidal conrod, said pin hubs (24) are formed to have facing sides (34) to define a gap between said pin hubs (24), the gap having a gap upper region and a gap lower region, wherein the gap is smaller in the gap upper region than in the gap lower region.

20. The piston according to claim 5, wherein said piston is made of a light metal.

21. The piston according to claim 5, wherein said piston is made of an aluminum alloy.

22. The piston according to claim 5, wherein said lateral edges (20, 22) of said two shaft wall portions (16) are curved.

* * * * *